(12) United States Patent
Nagai et al.

(10) Patent No.: US 10,281,631 B2
(45) Date of Patent: May 7, 2019

(54) OPTICAL MEMBER AND IMAGE DISPLAY DEVICE INCLUDING OPTICAL MEMBER

(71) Applicant: FUJIFILM Corporation, Tokyo (JP)

(72) Inventors: Michio Nagai, Kanagawa (JP); Yoji Ito, Kanagawa (JP); Daisuke Kashiwagi, Kanagawa (JP); Akira Yamamoto, Kanagawa (JP); Nobuhiko Ichihara, Kanagawa (JP); Hideyuki Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 31 days.

(21) Appl. No.: 15/616,419

(22) Filed: Jun. 7, 2017

(65) Prior Publication Data

US 2017/0269273 A1    Sep. 21, 2017

Related U.S. Application Data

(63) Continuation of application No. PCT/JP2015/084589, filed on Dec. 10, 2015.

(30) Foreign Application Priority Data

Dec. 11, 2014    (JP) .................................. 2014-251212

(51) Int. Cl.
*G02B 5/30* (2006.01)
*G06F 3/0354* (2013.01)
(Continued)

(52) U.S. Cl.
CPC ......... *G02B 5/3016* (2013.01); *G06F 3/0321* (2013.01); *G06F 3/03545* (2013.01); *G06F 3/0421* (2013.01)

(58) Field of Classification Search
CPC .................................................. G02B 5/3016
See application file for complete search history.

(56) References Cited

U.S. PATENT DOCUMENTS

| 8,367,189 B2 | 2/2013 | Sekine et al. |
| 8,993,100 B2 | 3/2015 | Sekine et al. |

(Continued)

FOREIGN PATENT DOCUMENTS

| JP | 2008-165385 A | 7/2008 |
| JP | 2008-180798 A | 8/2008 |

(Continued)

OTHER PUBLICATIONS

International Search Report issued in connection with International Patent Application No. PCT/JP2015/084589 dated Mar. 15, 2016.
(Continued)

*Primary Examiner* — Edmond C Lau
(74) *Attorney, Agent, or Firm* — Edwards Neils, LLC; Jean C. Edwards, Esq.

(57) ABSTRACT

Provided is an optical member including: a substrate; and a dot that is in contact with a surface of the substrate, in which the dot is formed of a liquid crystal material having a cholesteric structure, and the dot exhibits wavelength selective reflecting properties having two or more reflection peaks. By using the optical member according to the present invention, an image display device in which erroneous detection of data input is reduced can be provided.

20 Claims, 1 Drawing Sheet

(51) Int. Cl.
*G06F 3/042* (2006.01)
*G06F 3/03* (2006.01)

(56) References Cited

U.S. PATENT DOCUMENTS

| | | | |
|---|---|---|---|
| 2008/0182041 A1 | 7/2008 | Sekine et al. | |
| 2008/0233360 A1* | 9/2008 | Sekine | B32B 38/145 |
| | | | 428/195.1 |
| 2009/0279170 A1* | 11/2009 | Miyazaki | G02B 5/3025 |
| | | | 359/485.01 |
| 2011/0181820 A1* | 7/2011 | Watanabe | C03C 17/3405 |
| | | | 349/115 |

FOREIGN PATENT DOCUMENTS

| | | |
|---|---|---|
| JP | 2010-085532 A | 4/2010 |
| JP | 2011-154215 A | 8/2011 |
| JP | 2013-003496 A | 1/2013 |
| JP | 2013-076903 A | 4/2013 |
| JP | 2014-071250 A | 4/2014 |
| WO | 2013/054115 A1 | 4/2013 |

OTHER PUBLICATIONS

International Preliminary Report on Patentability of Chapter II issued in connection with International Patent Application No. PCT/JP2015/084589 dated Dec. 27, 2016.
Notification of Reasons for Refusal issued by the Japanese Patent Office (JPO) dated Oct. 31, 2017, in connection with corresponding Japanese Patent Application No. 2014-251212.
International Preliminary Report on Patentability issued by WIPO dated Jun. 15, 2017, in connection with international Patent Application No. PCT/JP2015/084589.

* cited by examiner

OPTICAL MEMBER AND IMAGE DISPLAY DEVICE INCLUDING OPTICAL MEMBER

CROSS-REFERENCE TO RELATED APPLICATIONS

This application is a continuation of PCT International Application No. PCT/JP2015/084589 filed on Dec. 10, 2015, which was published under PCT Article 21(2) in Japanese, and which claims priority under 35 U.S.C § 119 (a) to Japanese Patent Application No. 2014-251212 filed on Dec. 11, 2014. The above applications are hereby expressly incorporated by reference, in their entirety, into the present application.

BACKGROUND OF THE INVENTION

1. Field of the Invention

The present invention relates to an optical member and an image display device including the optical member.

2. Description of the Related Art

Recently, the necessity of a system in which data is handwritten on a display of an image display device using an electronic pen or the like to input data has increased. JP2008-165385A discloses a transparent sheet in which a dot pattern formed of a transparent ink is printed on a transparent substrate, in which the transparent ink includes a liquid crystal material having a cholesteric structure which selectively reflects infrared light. This transparent sheet can be used in the above-described system when mounted in a display device and used in combination with an electronic pen, the electronic pen including: an infrared sensor that detects reflected light from the dot pattern; and an infrared irradiating portion.

SUMMARY OF THE INVENTION

A dot in the dot pattern disclosed in JP2008-165385A has a diameter of 100 μm. However, it is considered that a smaller dot pattern will be required in the future in order to input more delicate handwritten data. As the size of dots becomes small, the intensity of reflected light from each of the dots decreases. Therefore, countermeasures against erroneous detection will also be required in the future.

Paragraph "0011" of JP2008-165385A discloses that an SN ratio of light reflected from a cholesteric structure to background light can be improved by using the cholesteric structure in combination with a circularly polarized light filter to perform detection, the cholesteric structure having circularly polarized light selective reflecting properties in which only either right circularly polarized light or left circularly polarized light is reflected. It is considered that erroneous detection decreases by improving the SN ratio. In a case where detection is performed in an oblique direction, for example, in a case where an electronic pen is tilted and used, the improvement of the SN ratio is not that much due to properties of the background light.

An object of the present invention is to provide an optical member including a dot formed of a reflecting material that is provided on a substrate, in which erroneous detection of a dot position can be reduced. Another object of the present invention is to provide an image display device which is capable of inputting data and in which erroneous detection of data input is reduced.

In a case where a liquid crystal material having a cholesteric structure is used as a reflecting material, selective reflection in a specific wavelength range is obtained depending on a helical pitch of the cholesteric structure. Therefore, in a case where reflected light is detected, an irradiating portion or a sensor is selected depending on the specific wavelength range. However, in a measurement at one wavelength, erroneous detection may occur under measurement conditions where the SN ratio is not sufficient. Therefore, the present inventors attempted to form a dot pattern, which reflects light in a plurality of wavelength ranges, using a liquid crystal material having a cholesteric structure, thereby completing the present invention.

Regarding a liquid crystal material which has a cholesteric structure having two or more center wavelengths of selective reflection, for example, JP2011-154215A discloses an infrared light reflection plate including layers having different reflection center wavelengths. However, the formation of a dot which is formed of a liquid crystal material having a cholesteric structure has many technical differences from the formation of a layer (film) which is formed of a liquid crystal material having a cholesteric structure from the viewpoints of, for example, the control of orientation of liquid crystal molecules. Therefore, the method described in JP2011-154215A is not applicable as it is. An optical member including a dot which exhibits wavelength selective reflecting properties having two or more reflection peaks is not known before the present application.

That is, the present invention provides the following [1] to [14].

[1] An optical member comprising:
a substrate; and
a dot that is in contact with a surface of the substrate,
in which the dot is formed of a liquid crystal material having a cholesteric structure, and
the dot exhibits wavelength selective reflecting properties having two or more reflection peaks.

[2] The optical member according to [1],
in which the dot exhibits wavelength selective reflecting properties having two or more reflection peaks with respect to both of incident light with an angle of 0° from a normal line perpendicular to the substrate and incident light with an angle of 27° from the normal line perpendicular to the substrate.

[3] The optical member according to [1] or [2],
in which the dot has two or more cholesteric structures having different helical pitches.

[4] The optical member according to [3],
in which the dot includes a portion which has two or more layered cholesteric structures having different helical pitches in a normal direction perpendicular to the substrate, and
sizes of the helical pitches of the two or more cholesteric structures increase toward the substrate.

[5] The optical member according to any one of [1] to [4],
in which a plurality of the dots are provided in a pattern shape on the surface of the substrate.

[6] The optical member according to any one of [1] to [5],
in which a diameter of the dot is 20 to 200 μm.

[7] The optical member according to any one of [1] to [5],
in which a diameter of the dot is 70 to 150 μm.

[8] The optical member according to any one of [1] to [7],
in which a value obtained by dividing a maximum height of the dot by the diameter of the dot is 0.16 to 0.30.

[9] The optical member according to any one of [1] to [8],
in which in an end portion of the dot, an angle between a surface of the dot and the substrate is 33° to 62°.

[10] The optical member according to any one of [1] to [9], in which the liquid crystal material is a material obtained by curing a liquid crystal composition including a liquid crystal compound and a chiral agent.

[11] The optical member according to any one of [1] to [10], in which at least one of the reflection peaks is present in an infrared range.

[12] The optical member according to [11], in which at least one of the reflection peaks is present in a wavelength range of 800 to 950 nm.

[13] The optical member according to any one of [1] to [12] which is transparent.

[14] An image display device comprising the optical member according to [13].

According to the present invention, a new optical member is provided. The optical member according to the present invention is attached to, for example, a display of an image display device such that it can be used for handwriting data on the display using an electronic pen or the like to input data. By using the optical member according to the present invention, erroneous detection of data input can be reduced.

DESCRIPTION OF THE PREFERRED EMBODIMENTS

Figure 1:
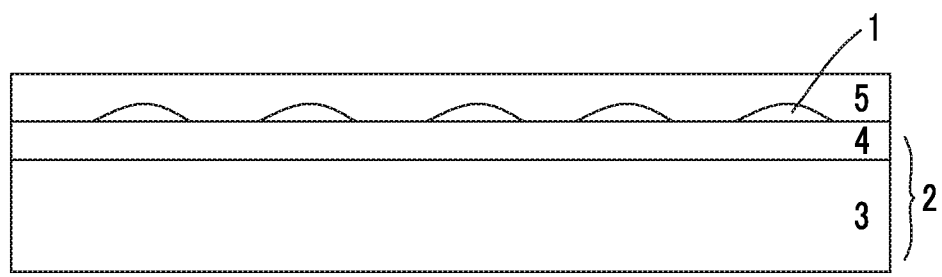
FIG. 1 is a cross-sectional view schematically showing an example of an optical member according to the present invention.

Hereinafter, the present invention will be described in detail.

In this specification, numerical ranges represented by "to" include numerical values before and after "to" as lower limit values and upper limit values.

In this specification, for example, unless specified otherwise, an angle such as "45°", "parallel", "perpendicular", or "orthogonal" represents that a difference from an exact angle is less than 5 degrees. The difference from an exact angle is preferably less than 4 degrees and more preferably less than 3 degrees.

In this specification, "(meth)acrylate" represents "either or both of acrylate and methacrylate".

In this specification, numerical values, numerical ranges, and qualitative expressions (for example, the expression "the same") implies numerical values, numerical ranges, and properties including errors which are generally allowable in the technical field. In particular, in this specification, the meaning of "all", "entire", or "entire surface" includes not only 100% but also a case where an error range is generally allowable in the technical field, for example, 99% or more, 95% or more, or 90% or more.

Visible light refers to light which can be observed by human eyes among electromagnetic waves and refers to light in a wavelength range of 380 nm to 780 nm. Invisible light refers to light in a wavelength range of shorter than 380 nm or longer than 780 nm.

Among infrared light rays, near infrared light refers to an electromagnetic wave in a wavelength range of 780 nm to 2500 nm. Ultraviolet light refers to light in a wavelength range of 10 to 380 nm.

In this specification, retroreflection refers to reflection in which incident light is reflected in an incidence direction.

In this specification, "polar angle" refers to an angle with respect to a normal line perpendicular to a substrate.

In this specification, a surface of a dot refers to a surface or an interface of the dot opposite to a substrate, which is a surface in contact with the substrate. An end portion of a dot does not interfere with contact between a surface of a dot and the substrate.

"Transparent" described in this specification represents that the light transmittance is preferably 50% or higher, more preferably 70% or higher, and still more preferably 85% or higher.

The light transmittance refers to a visible transmittance obtained using a method described in JIS A5759. That is, the visible transmittance is obtained by measuring a transmittance at a wavelength of 380 nm to 780 nm using a spectrophotometer and multiplying the measured transmittance by a weighting factor to obtain a weighted average, the weighting factor being obtained based on a spectral distribution of daylight D65 defined by The international Commission on Illumination (CIE) and a wavelength distribution and a wavelength interval of spectral luminous efficiency function for photopic vision defined by CIE.

In this specification, "haze" refers to a value measured using a haze meter NDH-2000 (manufactured by Nippon Denshoku Industries Co., Ltd.).

Theoretically, haze refers to a value expressed by the following expression.

(Diffuse Transmittance of Natural Light at 380 to 780 nm)/(Diffuse Transmittance of Natural Light at 380 to 780 nm+Parallel Transmittance of Natural Light)×100%

The diffuse transmittance refers to a value calculated by subtracting the parallel transmittance from a total transmittance which is obtained using a spectrophotometer and an integrating sphere unit. The parallel transmittance refers to a transmittance at 0° in a case where a value measured using an integrating sphere unit is used.

<Optical Member>

The optical member includes: a substrate; and a dot that is formed on a surface of the substrate, that is, a dot that is in contact with the surface of the substrate. The dot that is in contact with the surface of the substrate refers to a dot that is in direct contact with the surface of the substrate.

The shape of the optical member is not particularly limited and is, for example, a film shape, a sheet shape, or a plate shape. FIG. 1 is a cross-sectional view schematically showing an example of the optical member according to the present invention. In this example, dots 1 are in contact with an underlayer-side surface of a substrate 2 including a support 3 and an underlayer 4. An overcoat layer 5 is provided on the dot-formed surface side of the substrate so as to cover the dots 1.

The optical member according to the present invention may be transparent or not in the visible range depending on the application and is preferably transparent.

In the optical member according to the present invention, the upper limit of the haze is preferably 5% or lower, more preferably 3% or lower, and still more preferably 2% or lower.

<Substrate>

The substrate included in the optical member according to the present invention functions as a substrate for forming the dot on the surface of the underlayer.

It is preferable that the reflectance of the substrate is low at a wavelength where the dot reflects light, and it is preferable that the substrate does not include a material which reflects light at a wavelength where the dot reflects light.

In addition, it is preferable that the substrate is transparent in the visible range. In addition, the substrate may be colored. However, it is preferable that the substrate is not colored or the area of the substrate colored is small. Further, the refractive index of the substrate is preferably about 1.2 to 2.0 and more preferably about 1.4 to 1.8. The above-described configurations are made in order to prevent deterioration in the visibility of an image displayed on a display in a case where the optical member is used for, for example, a front surface of the display.

The thickness of the substrate may be selected depending on the application without any particular limitation, and is preferably about 5 μm to 1000 μm, more preferably 10 μm to 250 μm, and still more preferably 15 μm to 150 μm.

The substrate may have a single-layer structure or a multi-layer structure. In a case where the substrate has a single-layer structure, examples thereof include glass, triacetyl cellulose (TAC), polyethylene terephthalate (PET), polycarbonates, polyvinyl chloride, acryl, and polyolefin. In a case where the substrate has a multi-layer structure, examples thereof a substrate including: one of the examples of the substrate having a single-layer structure that is provided as a support; and another layer that is provided on a surface of the support.

Examples of the other layer include an underlayer that is provided between the support and the dot. The underlayer is preferably a resin layer and more preferably a transparent resin layer. Examples of the underlayer include a layer for adjusting the surface shape during the formation of a dot, a layer for improving adhesion properties with a dot, and an alignment layer for adjusting the orientation of a polymerizable liquid crystal compound during the formation of a dot. It is preferable that the reflectance of the underlayer is low at a wavelength where the dot reflects light, and it is preferable that the underlayer does not include a material which reflects light at a wavelength where the dot reflects light. In addition, it is preferable that the underlayer is transparent. Further, the refractive index of the underlayer is preferably about 1.2 to 2.0 and more preferably about 1.4 to 1.8. It is preferable that the underlayer is a thermosetting resin or a photocurable resin obtained by curing a composition including a polymerizable compound which is directly applied to a surface of the support. Examples of the polymerizable compound include a non-liquid crystal compound such as a (meth)acrylate monomer or a urethane monomer.

The thickness of the underlayer is not particularly limited and is preferably 0.01 to 50 μm and more preferably 0.05 to 20 μm.

The surface of the substrate or the underlayer may be treated before the formation of the dot. For example, in order to form a dot having a desired shape or to form a desired dot pattern, a hydrophilic treatment or a treatment for forming an uneven shape may be performed on the surface of the substrate.

<Dot>

The optical member according to the present invention includes a dot that is in contact with a surface of the substrate. The dot may be formed on a single surface or both surfaces of the substrate and is preferably formed on a single surface thereof.

One dot or two or more dots may be formed on the surface of the substrate. Two or more dots may be provided to be adjacent to each other on the surface of the substrate such that the total surface area of the dots is 50% or more, 60% or more, or 70% or more with respect to the area of the surface of the substrate where the dots are formed. For example, in this case, the optical characteristics of the dots such as selective reflecting properties may match with the optical characteristics of substantially the entire area of the optical member, in particular, the entire area of the surface where the dots are formed. On the other hand, two or more dots may be provided to be distant from each other on the surface of the substrate such that the total surface area of the dots is less than 50%, 30% or less, or 10% or less with respect to the area of the surface of the substrate where the dots are formed. For example, in this case, the optical characteristics of the surface of the optical member where the dots are formed may be recognized as a contrast between the optical characteristics of the substrate and the optical characteristics of the dots.

A plurality of dots are formed in a pattern shape and may have a function of presenting information. For example, by forming the dots so as to provide position information on an optical member which is formed in a sheet shape, the optical member can be can be used as a sheet which can be mounted on a display and is capable of inputting data.

In a case where the dots are formed in a pattern shape, for example, a plurality of dots having a diameter of 20 to 200 μm are formed, 10 to 100 dots, preferably 15 to 50 dots, and more preferably 20 to 40 dots are provided on average in a square having a size of 2 mm×2 mm on the substrate surface.

In a case where a plurality of dots are provided on a surface of the substrate, the dots may have the same diameter and shape or different diameters and shapes and preferably has the same diameter and shape in order to obtain uniform reflected light from the respective dots. For example, it is preferable that the dots are formed under the same conditions for forming the dots having the same diameter and shape.

In this specification, the description of the dot is applicable to all the dots in the optical member according to the present invention. Further, it is allowable that the optical member according to the present invention including the above-described dots also includes a dot which deviates from the above description due to an error which is allowable in the technical field.

[Shape of Dot]

The shape of the dot is not particularly limited and is preferably is circular when observed from a normal direction perpendicular to the substrate. The circular shape is not necessarily a perfect circle and may be a substantially circular shape or an elliptical shape. For example, a shape in which a plurality of circles overlap each other while being slightly shifted from each other may be adopted. The center of the dot described herein refers to the center of the circle or the center of gravity. In a case where a plurality of dots are present on the surface of the substrate, the shapes of the clots may be the same as or different from each other and are preferably the same as or at least similar to each other.

The diameter of the dot film is preferably 20 to 200 μm and more preferably 70 to 150 μm. In a case where the dot is not circular, the dot is approximated to a circle to measure or calculate the diameter thereof.

The diameter of the dot can be obtained by measuring the length of a line, which ranges from an end portion (an edge or a boundary of the dot) to another end portion and passes through the center of the dot, in an image obtained using a microscope such as a laser microscope, a scanning electron microscope (SEM), or a transmission electron microscope (TEM). The number of dots and the distance between dots can be obtained from a microscopic image obtained using a laser microscope, a scanning electron microscope (SEM), or a transmission electron microscope (TEM)

It is preferable that the dot includes a portion having a height which continuously increases to a maximum height in a direction moving from an end portion of the dot to the center of the dot. In this specification, the above portion will also be referred to as the inclined portion or the curved portion. That is, it is preferable that the dot includes an inclined portion, a curved portion, or the like whose height increases from an end portion of the dot to the center of the dot.

"The height" of the dot described in this specification refers to "the shortest distance from a point of a surface of the dot to a surface of the substrate where the dot is formed". In addition, in a case where the substrate has convex and concave portions, a surface of an end portion of the dot extending from the substrate is set as the surface where the dot is formed. The maximum height refers to a maximum value of the height which is, for example, the shortest distance from the peak of the dot to the surface of the substrate where the dot is formed. The height of the dot can be obtained from a cross-sectional view of the dot which is obtained by focal position scanning using a laser microscope or obtained using a microscope such as a SEM or a TEM.

Examples of a shape of a structure including the inclined portion or the curved portion include a hemispherical shape in which the substrate side is planar, a shape (spherical segment shape) in which the top of the hemispherical shape is cut and smoothened to be substantially parallel to the substrate, a conical shape having a bottom on the substrate side, a shape (truncated conical shape) in which the top of the conical shape is cut and smoothened to be substantially parallel to the substrate, and a shape which can be approximated to one of the above shapes. Among these shapes, a hemispherical shape in which the substrate side is planar, a shape in which the top of the hemispherical shape is cut and smoothened to be substantially parallel to the substrate, a shape in which the top of a conical shape having a bottom on the substrate side is cut and smoothened to be substantially parallel to the substrate, or a shape which can be approximated to one of the above shapes is preferable. The hemispherical shape represents not only a hemispherical shape in which a surface including the center of a sphere is planar but also any one of spherical segment shapes obtained by cutting a sphere into two segments at an arbitrary position.

A point of the dot surface for obtaining the maximum height of the dot may be present at the peak of a hemispherical shape or a conical shape or may be present on a surface which is cut and smoothened to be substantially parallel to the substrate. It is preferable that the maximum height of the dot is obtained at all the points of the smooth surface. It is also preferable that the maximum height is obtained at the center of the dot.

It is preferable that a value (maximum height/diameter) obtained by dividing the maximum height by the diameter of the dot is 0.16 to 0.30. It is preferable that the above-described condition is satisfied particularly in a shape in which the height of the dot continuously increases to the maximum height from an end portion of the dot and in which the maximum height is obtained at the center of the dot, for example, a hemispherical shape in which the substrate side is planar, a shape in which the top of the hemispherical shape is cut and flattened to be substantially parallel to the substrate, or a shape in which the top of a conical shape having a bottom on the substrate side is cut and flattened to be substantially parallel to the substrate. The ratio maximum height/diameter is more preferably 0.18 to 0.28.

In addition, an angle (for example, an average value) between a surface of the dot and the substrate (surface of the substrate where the dot is formed) is preferably 33° to 62° and more preferably 35° to 60°. By setting the angle in the above-described range, the dot can be made to exhibit high retroreflection properties at a light incidence angle which is suitable for the applications of the optical member described below.

The angle can be obtained from a cross-sectional view of the dot which is obtained by focal position scanning using a laser microscope or obtained using a microscope such as a SEM or a TEM. In this specification, in a SEM image of a cross-sectional view of a surface of the dot perpendicular to the substrate including to the center of the dot, the angle of a contact portion between the substrate and the dot surface is measured.

[Optical Characteristics of Dot]

In the optical member according to the present invention, the dot exhibits wavelength selective reflecting properties having two or more reflection peaks. As a result, the position of the dot can be detected using different kinds of light at a plurality of wavelengths, and erroneous detection or erroneous recognition of the dot position in the optical member can be prevented.

Light where the dot exhibits selective reflecting properties is not particularly limited. For example, any one of infrared light, visible light, and ultraviolet light may be used. In this case, a wavelength having two or more reflection peaks may be selected from the wavelength ranges of the above kinds of light. For example, in a case where the optical member is attached to a display device and is used for directly handwriting data on the display device to input data, the wavelength of light to which the dot exhibits selective reflecting properties is preferably a wavelength in the invisible range, more preferably a wavelength in the infrared range, and still more preferably a wavelength in the near infrared range in order not to adversely affect a display image. For example, it is preferable that a spectrum of reflection from the dot shows a reflection wavelength range in which a center wavelength is present in a wavelength range of 750 to 2000 nm and preferably 800 to 1500 nm. In this case, a wavelength having two or more reflection peaks may be selected from the above wavelength ranges. It is also preferable that the reflection wavelength is selected based on a wavelength of light emitted from a light source which is used in combination or a wavelength of light which is detected by a image pickup element (sensor).

It is preferable that the dot is transparent in the visible range. In addition, the dot may be colored. However, it is preferable that the dot is not colored or the area of the dot colored is small. The above-described configurations are made in order to prevent deterioration in the visibility of an image displayed on a display in a case where the optical member is used for, for example, a front surface of the display.

[Cholesteric Structure]

The dot is formed of a liquid crystal material having a cholesteric structure.

It is known that the cholesteric structure exhibits selective reflecting properties at a specific wavelength. A center wavelength of the selective reflection depends on a pitch P (=helical cycle) of a helical structure in the cholesteric structure and complies with an average refractive index n of a cholesteric liquid crystal and a relationship of $\lambda=n\times P$. Therefore, the selective reflection wavelength can be adjusted by adjusting the pitch of the helical structure. The reflection peak wavelength is similar to the center wavelength of the selective reflection and changes in the same way as that of the center wavelength of the selective reflection. Therefore, the reflection peak wavelength can be adjusted by adjusting the pitch of the helical structure.

The pitch of the cholesteric structure depends on the kind of a chiral agent which is used in combination of a polymerizable liquid crystal compound during the formation of the dot, or the concentration of the chiral agent added. Therefore, a desired pitch can be obtained by adjusting the kind and concentration of the chiral agent.

The details of the adjustment of the pitch can be found in "Fuji Film Research&Development" No. 50 (2005), pp. 60 to 63. As a method of measuring a helical twisting direction or a pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric structure is observed as a stripe pattern including bright portions and dark portions when observed with a scanning electron microscope (SEM). Two cycles of the bright portion and the dark portion (two bright portions and two dark portions) correspond to one helical pitch. Therefore, the pitch can be measured from the SEM cross-sectional view. A normal line perpendicular to each line of the stripe pattern is a helical axis direction.

A full width at half maximum $\Delta\lambda$ (nm) of a selective reflection bandwidth (circularly polarized light reflection bandwidth) where selective reflection is exhibited depends on a birefringence $\Delta n$ of the liquid crystal compound and the pitch P and complies with a relationship of $\Delta\lambda = \Delta n \times P$. Therefore, the selective reflection bandwidth can be controlled by adjusting $\Delta n$. $\Delta n$ can be adjusted by adjusting the kind of the polymerizable liquid crystal compound and a mixing ratio thereof, or by controlling a temperature during oriented immobilization. The full width at half maximum of the reflection wavelength range is adjusted depending on the application of the optical member according to the present invention and is, for example, 50 to 500 nm and preferably 100 to 300 nm.

In addition, selectively reflected light of the cholesteric structure has circularly polarized light selectivity, and selectively reflected light of one cholesteric structure is right circularly polarized light or left circularly polarized light. Whether or not the reflected light of the cholesteric structure is right circularly polarized light or left circularly polarized light is determined depending on a helical twisting direction of the cholesteric structure. In a case where the helical twisting direction of the cholesteric structure is right, right circularly polarized light is reflected, and in a case where the helical twisting direction of the cholesteric structure is left, left circularly polarized light is reflected. In general, the helical twisting direction of the cholesteric structure depends on the chiral agent in the liquid crystal composition described below. A cholesteric structure in which the helical twisting direction is right can be formed using a chiral agent from which a right helical twisting direction is derived, and a cholesteric structure in which the helical twisting direction is left can be formed using a chiral agent from which a left helical twisting direction is derived.

In the optical member according to the present invention, the dot may include two or more cholesteric structures having different helical pitches. A configuration in which the dot includes two or more cholesteric structures having different helical pitches is not particularly limited. In order to obtain a structure which exhibits wavelength selective reflecting properties having two or more reflection peaks at least in a normal direction of the substrate, and it is preferable that the dot includes a portion which has two or more layered cholesteric structures in the normal direction perpendicular to the substrate. At this time, all the cholesteric structures only have to have a helical axis which forms an angle of 40° to 0°, preferably 30° to 0°, and more preferably 20° to 0° with respect to the normal direction perpendicular to the substrate. In a structure example of the above-described configuration, one dot is disposed on a portion in contact with a surface of the dot, and another cholesteric structure is disposed inside the dot. About 3 to 10 layered cholesteric structures having different helical pitches may be formed on the surface of the dot. The order is not particularly limited, and it is preferable that the sizes of the helical pitches of the cholesteric structures increase toward the substrate. It is preferable that cholesteric structures having different helical pitches which are adjacent to each other are in direct contact with each other in the dot.

[Cholesteric Structure in Dot]

It is preferable that, in the dot, an angle between a helical axis of the cholesteric structure and a surface of the dot is in a range of 50° to 90°. The angle is more preferably in a range of 60° to 90° and still more preferably in a range of 70° to 90°. It is more preferable that, on a surface of the dot, an angle between a helical axis of the cholesteric structure and the surface of the dot is in a range of 70° to 90°.

The helical axis of the cholesteric structure is present in a normal direction perpendicular to a line formed using each dark portion when a cross-section of the dot is observed with a scanning electron microscope (SEM). An angle between the helical axis of the cholesteric structure and a surface of the dot refers to an angle between it is preferable that an angle between a normal line perpendicular to a line, which is formed using a first dark portion from the surface of the dot, and the surface of the dot. When the surface is curved, an angle between the normal line and a tangent line of the surface in the cross-section may be obtained. In particular, by satisfying the angle in the inclined portion or the curved portion, the dot can also exhibit high retroreflection properties with respect to light incident from various directions with an angle from the normal direction perpendicular to the substrate. Further, the dot can exhibit reflecting properties having two or more reflection peaks with respect to light incident from various directions with an angle from the normal direction perpendicular to the substrate. For example, depending on the shape of the dot, the dot can exhibit high retroreflection properties and reflecting properties having two or more reflection peaks with respect to light incident from a direction with a polar angle of 27° and preferably with respect to light incident from a direction with a polar angle of 45°. Here, a polar angle of light incident on a dot refers to a polar angle light immediately before incidence on the dot and, as described below, may be different from a polar angle of light incident on the outermost surface of an optical member on the incident light side in a case where the optical member includes an overcoat layer described below. The optical member according to the present invention can exhibit reflecting properties having two or more reflection peaks at least within a polar angle of 27° even in the configuration the overcoat layer is provided.

The cholesteric structure can be obtained by immobilizing a cholesteric liquid crystal phase. The structure in which a cholesteric liquid crystal phase is immobilized may be a structure in which the orientation of the liquid crystal compound as a cholesteric liquid crystal phase is immobilized. Typically, the structure in which a cholesteric liquid crystal phase is immobilized may be a structure which is obtained by making the polymerizable liquid crystal compound to be in a state where a cholesteric liquid crystal phase is oriented, polymerizing and curing the polymerizable liquid crystal compound with ultraviolet irradiation, heating, or the like to form a layer having no fluidity, and concurrently changing the state of the polymerizable liquid crystal compound into a state where the oriented state is not changed by an external field or an external force. The structure in which a cholesteric liquid crystal phase is immobilized is not particularly limited as long as the optical characteristics of the cholesteric liquid crystal phase are maintained, and the liquid crystal compound does not necessarily exhibit liquid crystallinity. For example, the molecular weight of the polymerizable liquid crystal compound may be increased by a curing reaction such that the liquid crystallinity thereof is lost.

[Liquid Crystal Composition]

Examples of a material used for forming the cholesteric structure include a liquid crystal composition including a liquid crystal compound and a chiral agent. It is preferable that the liquid crystal compound is a polymerizable liquid crystal compound.

The liquid crystal composition including a polymerizable liquid crystal compound may further include, for example, a surfactant or a polymerization initiator.

(Polymerizable Liquid Crystal Compound)

The polymerizable liquid crystal compound may be a rod-shaped liquid crystal compound or a disk-shaped liquid crystal compound and is preferably a rod-shaped liquid crystal compound.

Examples of the rod-shaped polymerizable liquid crystal compound for forming a cholesteric liquid crystal layer include a rod-shaped nematic liquid crystal compound. As the rod-shaped nematic liquid crystal compound, an azomethine compound, an azoxy compound, a cyanophenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3. Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586, WO95/24455, WO97/00600, WO98/23580, WO98/52905, JP1989-272551A (JP-H1-272551A), JP1994-16616A (JP-H6-16616A), JP1995-110469A (JP-H7-110469A), JP1999-80081A (JP-H11-80081A), JP2001-328973A, JP2014-198815A, and JP2014-198814A. Two or more polymerizable liquid crystal compounds may be used in combination. In a case where two or more polymerizable liquid crystal compounds are used in combination, the orientation temperature can be decreased.

Specific examples of the polymerizable liquid crystal compound include a compound represented by any one of the following formulae (1) to (11).

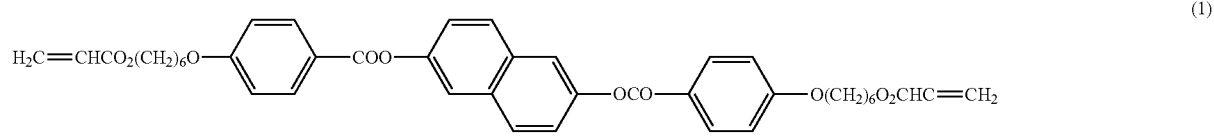

(1)

(2)

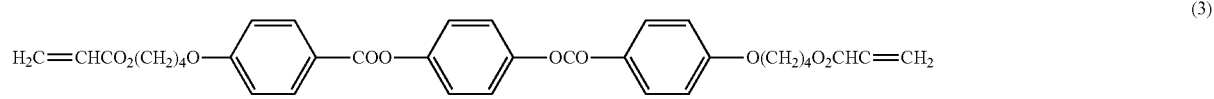

(3)

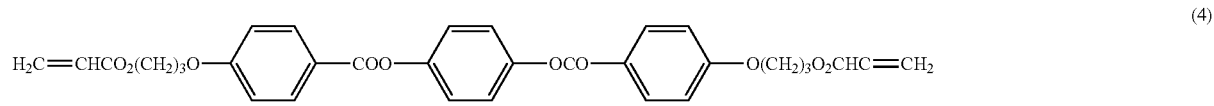

(4)

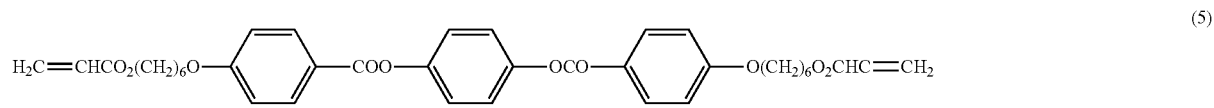

(5)

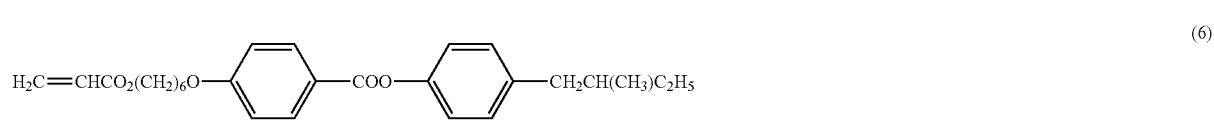

(6)

-continued (7)
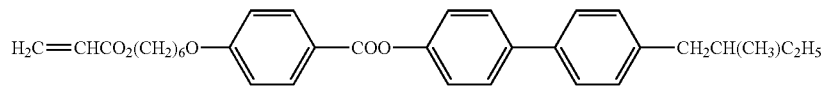

(8)
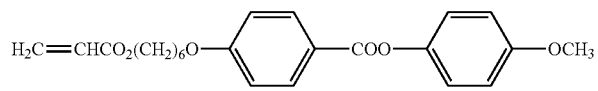

(9)
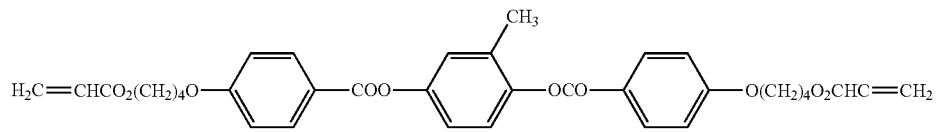

(10)
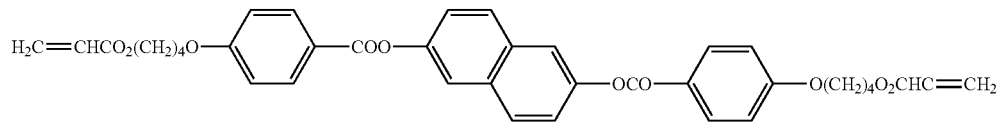

(11)
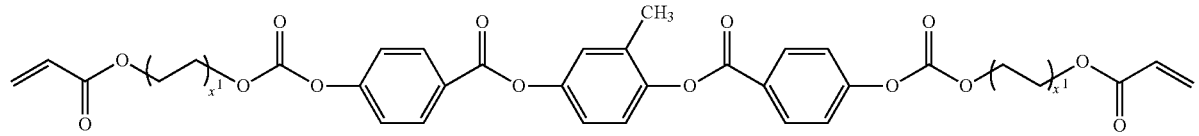

(In compound (11), $X^1$ represents 2 to 5 (integer))

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

(Chiral Agent (Optically Active Compound))

The chiral agent has a function of causing a helical structure of a cholesteric liquid crystal phase to be formed. The chiral compound may be selected depending on the purpose because a helical twisting direction or a helical pitch derived from the compound varies.

A helical pitch derived from the chiral agent may be expressed by helical twisting power (HTP) which is an index indicating a power with which the chiral agent twists liquid crystal. HIP can be calculated from the expression "HTP=n/ ($\lambda \times 0.01 \times C$)", wherein $\lambda$ represents a selective reflection wavelength of a cholesteric liquid crystal layer which is formed of the liquid crystal composition including the chiral agent and the liquid crystal compound, n represents an average refractive index of the cholesteric liquid crystal layer, and C represents a chiral agent concentration (mass %).

The chiral agent is not particularly limited, and a well-known compound (for example, Liquid Crystal Device Handbook (No. 142 Committee of Japan Society for the Promotion of Science, 1989), Chapter 3, Article 4-3, chiral agent for TN or STN, p. 199), isosorbide, or an isomannide derivative can be used.

In general, the chiral agent includes an asymmetric carbon atom. However, an axially asymmetric compound or a surface asymmetric compound not having an asymmetric carbon atom can be used. Examples of the axially asymmetric compound or the surface asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this configuration, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

Specific examples of the chiral agent include a compound represented by the following Formula (12).

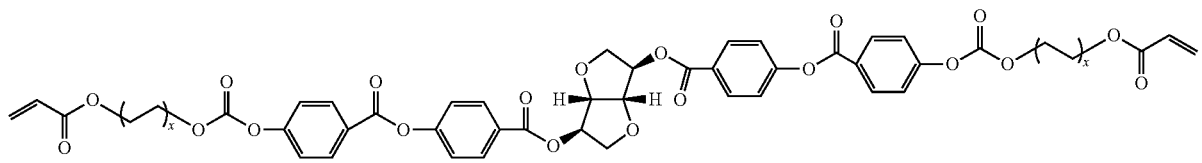

(12)

In the formula, X represents 2 to 5 (integer).

The content of the chiral agent in the liquid crystal composition is preferably 0.01 mol % to 200 mol % and more preferably 1 mol % to 30 mol % with respect to the amount of the polymerizable liquid crystal compound.

(Surfactant)

The liquid crystal composition may include a surfactant. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and "0082" to "0085" of JP2002-129162A, and fluorine (meth)acrylate described in paragraphs "0018" to "0043" of JP2007-272185A.

As the surfactant, one kind may be used alone, or two or more kinds may be used in combination.

Examples of the fluorine surfactant include a compound represented by Formula (I) described in paragraphs "0082" to "0090" of JP2014-119605A.

The addition amount of the surfactant in the liquid crystal composition is preferably 0.01 mass % to 10 mass %, more preferably 0.01 mass % to 5 mass %, and still more preferably 0.02 mass % to 1 mass % with respect to the total mass of the polymerizable liquid crystal compound.

(Polymerization Initiator)

In a case where the liquid crystal composition includes a polymerizable compound, it is preferable that the liquid crystal composition includes a polymerization initiator. In a configuration where a polymerization reaction progresses with ultraviolet irradiation, it is preferable that the polymerization initiator is a photopolymerization initiator which initiates a polymerization reaction with ultraviolet irradiation. Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triaryl imidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 mass % to 12 mass % with respect to the content of the polymerizable liquid crystal compound.

(Crosslinking Agent)

In order to improve the film hardness after curing and to improve durability, the liquid crystal composition may arbitrarily include a crosslinking agent. As the crosslinking agent, a curing agent which can perform curing with ultraviolet light, heat, moisture, or the like can be preferably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these curing agents, one kind may be used alone, or two or more kinds may be used in combination.

The content of the crosslinking agent is preferably 3 mass % to 20 mass % and more preferably 5 mass % to 15 mass %. In a case where the content of the crosslinking agent is lower than 3 mass %, an effect of improving the crosslinking density may not be obtained. In a case where the content of the crosslinking agent is higher than 20 mass %, the stability of a cholesteric liquid crystal layer may deteriorate.

(Other Additives)

In a case where an ink jet method described below is used as a method of forming the dot, a monofunctional polymerizable monomer may be used in order to obtain generally required ink properties. Examples of the monofunctional polymerizable monomer include 2-methoxyethyl acrylate, isobutyl acrylate, isooctyl acrylate, isodecyl acrylate, and octyl/decyl acrylate.

In addition, optionally, a polymerization inhibitor, an antioxidant, a ultraviolet absorber, a light stabilizer, a colorant, metal oxide particles or the like can be added to the liquid crystal composition in a range where optical performance and the like do not deteriorate.

(Solvent)

It is preferable that the liquid crystal composition is used as a liquid during the formation of the dot.

The liquid crystal composition may include a solvent. The solvent is not particularly limited and can be appropriately selected depending on the purpose. An organic solvent is preferably used.

The organic solvent is not particularly limited and can be appropriately selected depending on the purpose. Examples of the organic solvent include a ketone such as methyl ethyl ketone or methyl isobutyl ketone, an alkyl halide, an amide, a sulfoxide, a heterocyclic compound, a hydrocarbon, an ester, and an ether. Among these curing agents, one kind may be used alone, or two or more kinds may be used in combination. Among these, a ketone is more preferable in consideration of an environmental burden. The above-described component such as the above-described monofunctional polymerizable monomer may function as the solvent.

[Method of Forming Dot]

A dot can be formed on a surface of the substrate by applying the liquid crystal composition to the substrate, drying the liquid crystal composition, and optionally curing the liquid crystal composition.

The application of the liquid crystal composition to the substrate is preferably performed by jetting. In a case where a plurality of dots are formed on the substrate, the liquid crystal composition may be printed as an ink. A printing method is not particularly limited and, for example, an ink jet method, a gravure printing method, or a flexographic printing method can be used. Among these, an ink jet method is preferable. The pattern of the dots can also be formed using a well-known printing technique.

(Jetting)

Jetting which is particularly preferable as a method of applying a liquid crystal composition to the substrate will be described below.

It is preferable that jetting is performed twice or more times per one dot. By performing jetting twice or more times, liquid crystal compositions having different chiral agent concentrations and the like or having different kinds of constituent elements such as the chiral agent can be applied to the substrate to form one dot in a state where they are separated from each other. The second or subsequent liquid crystal composition may be jetted to a position of the substrate where the previous liquid crystal composition has been jetted.

The present inventors found that, in a case where liquid crystal composition is jetted again to the previously jetted portion during the formation of the dot, the size of the shape of the dot does not increase corresponding to the shape of the previously formed shape but is likely to increase in a height direction compared to the size when observed from the normal direction perpendicular to the substrate. In a case where the size of the shape of the dot increases in the height direction, a dot in which two or more layered cholesteric structures which are formed of different liquid crystal compositions are sequentially present from the surface can be obtained with a high maximum height, and a dot having two or more reflection peaks with respect to incident light with a large polar angle can be formed. That is, a dot which exhibits wavelength selective reflecting properties having two or more reflection peaks with respect to incident light with a polar angle 27° or 45° as described above can be formed.

In a case where a liquid crystal composition, which is different from the previously jetted liquid crystal composition in the chiral agent concentration and the like or in the kind of constituent elements such as the chiral agent, is jetted during second or subsequent jetting, it is preferable that the previously jetted liquid crystal composition is dried before the second or subsequent jetting. In addition, in a case where the liquid crystal composition includes a polymerizable liquid crystal compound, it is more preferable that the liquid crystal composition is dried and cured. The reason for this is that the cholesteric structures can be prevented from becoming unstable due to a difficulty of mixing of chiral agents having different pitches to be controlled, and thus excellent reflection properties can be obtained. In the liquid crystal compound which is jetted to the surface of the cured liquid crystal composition, the orientation of liquid crystal compound molecules is likely to be excellent.

In addition, the chiral agent and the like may permeate from the cured liquid crystal composition into the non-cured liquid crystal composition to be jetted to the surface of the cured liquid crystal composition. From this viewpoint, it is preferable that a liquid crystal composition having a low chiral agent concentration is jetted first, this liquid crystal composition is dried and cured, and then a liquid crystal composition having a high chiral agent concentration is jetted to a surface of the previously jetted liquid crystal composition.

The number of times of jetting for forming one dot may be twice or more times and is preferably 2 to 200 times, more preferably 2 to 100 times, still more preferably 2 to 80 times, and even still more preferably 2 to 50 times.

In a case where jetting is performed three times or more, the liquid crystal composition having the same composition may be repeatedly jetted. In a case where the liquid crystal composition having the same composition as that of the previously jetted liquid crystal composition is jetted, the jetting may be performed before or after the drying of the previously jetted liquid crystal composition. In addition, in a case where the liquid crystal composition includes a polymerizable liquid crystal compound, the jetting may be performed before or after the curing of the previously jetted liquid crystal composition.

For example, the procedure of forming a dot using the liquid crystal composition including a polymerizable liquid crystal compound is as follows. In the following description, a liquid crystal composition 1 and a liquid crystal composition 2 are different from each other in the concentration or kind of the chiral agent.

First Example (1) The liquid crystal composition 1 is jetted to the substrate 1 to 20 times without performing drying and curing steps.

(2) The jetted liquid crystal composition 1 is dried.

(3) The liquid crystal composition 2 which is different from the liquid crystal composition 1 is jetted 1 to 100 times.

(4) The jetted liquid crystal composition 2 is dried, and both the liquid crystal composition 1 and the liquid crystal composition 2 are cured.

Second Example (1) The liquid crystal composition 1 is jetted to the substrate 1 to 20 times without performing drying and curing steps.

(2) The jetted liquid crystal composition 1 is dried and cured.

(3) The liquid crystal composition 2 which is different from the liquid crystal composition 1 is jetted 1 to 100 times.

(4) The jetted liquid crystal composition 2 is dried and cured.

In the above-described first and seconds examples, the number of times of the jetting of the liquid crystal composition 2 may be, for example, 3 to 8 times or about 5 times with respect to the number of times of the jetting of the liquid crystal composition 1.

Any one of the first and second examples may be repeated twice or more, or two or more selected from the first and second examples may be combined.

In the above-described examples, the liquid crystal composition 1 jetted to the surface of the substrate is the liquid crystal composition having a low chiral agent concentration, and the liquid crystal composition 2 is the liquid crystal composition having a high chiral agent concentration. In addition, it is preferable that the jetted liquid crystal composition 1 is a liquid crystal composition which includes a chiral agent having a low HTP, and the liquid crystal composition 2 is a liquid crystal composition which includes a chiral agent having a high HTP.

In the liquid crystal composition 1 and the liquid crystal composition 2, the kinds and concentrations of the liquid crystal compounds may be different from each other.

Regarding a technique of jetting the second or subsequent liquid crystal composition to the same position or position pattern as that of the previously jetted liquid crystal composition, an alignment method which is well-known in the printing technique field can be applied.

Whenever jetting is performed once, the amount of the liquid crystal composition (the amount of ink) per one dot may be, for example, 1 pL to 20 pL, and is preferably 2 pL to 10 pL and more preferably 5 pL to 6 pL.

The total amount of the liquid crystal compositions jetted per one dot may be, for example, 2 pL to 1200 pL, and is preferably 10 pL to 600 pL, more preferably 50 pL to 500 pL and still more preferably 100 pL to 400 pL.

(Drying of Liquid Crystal Composition)

The liquid crystal composition applied to the surface of the substrate is optionally dried. The liquid crystal composition may be heated for drying or may be dried and then heated. In a drying or heating step, the liquid crystal compound in the liquid crystal composition only has to be oriented to form a cholesteric liquid crystal phase. In the case of heating, the heating temperature is preferably 200° C. or lower and more preferably 130° C. or lower.

In a case where drying is performed multiple times in the process of forming a dot, drying conditions may be same or different from each other.

(Curing of Liquid Crystal Composition)

In a case where the liquid crystal composition is a polymerizable liquid crystal compound, the oriented polymerizable liquid crystal compound may be polymerized by curing the liquid crystal composition. The liquid crystal composition may be cured by light irradiation or heating and preferably by light irradiation. Regarding the light irradiation, ultraviolet light is preferably used. The irradiation energy is preferably 20 mJ/m$^2$ to 50 J/cm$^2$ and more preferably 100 mJ/cm$^2$ to 1500 mJ/cm$^2$. In order to promote a photopolymerization reaction, light irradiation may be performed under heating conditions or in a nitrogen atmosphere. The wavelength of irradiated ultraviolet light is preferably 250 nm to 430 nm. From the viewpoint of stability, the polymerization degree is preferably high, and is preferably 70% or higher and more preferably 80% or higher. The polymerization degree can be determined by obtaining a consumption ratio between polymerizable functional groups using art IR absorption spectrum.

In a case where curing is performed multiple times in the process of forming a dot, curing conditions may be same or different from each other.

<Overcoat Layer>

The optical member may include an overcoat layer. The overcoat layer may be provided on a surface of the substrate where the dot is formed, that is, a surface of the substrate in contact with the dot and it is preferable that the surface of the optical member is smoothened.

The overcoat layer is not particularly limited and is preferably a resin layer having a refractive index of about 1.4 to 1.8. In a case where the optical member is used as an input medium such as an input sheet on a display surface of an image display device or the like, in order to prevent scattering of image light from the image display device, a difference in refractive index between the overcoat layer and the dot formed of the liquid crystal material is preferably 0.2 or lower and more preferably 0.1 or lower. The refractive index of the dot formed of the liquid crystal material is about 1.6. By using an overcoat layer having a refractive index of about 1.4 to 1.8, the polar angle of light which is actually incident on the dot can be reduced. For example, in a case where the overcoat layer having a refractive index of 1.6 is used and light is incident on the optical member at a polar angle of 45°, a polar angle at which light is reliably incident on the dot can be made to be about 27°. Therefore, by using the overcoat layer, the polar angle of light at which the optical member exhibits retroreflection properties can be widened, and high retroreflection properties can be obtained at a wider angle even in the surface of the dot which forms a small angle with the substrate. In addition, the overcoat layer may function as an anti-reflection layer, a pressure sensitive adhesive layer, an adhesive layer, or a hard coat layer.

Examples of the overcoat layer include a resin layer which is obtained by applying a composition including a monomer to the surface of the substrate that is in contact with the dot, and curing the coating film. The resin is not particularly limited and may be selected in consideration of, for example, adhesiveness with the substrate or the liquid crystal material for forming the dot. For example, a thermoplastic resin, a thermosetting resin, or a ultraviolet curable resin can be used. From the viewpoints of durability, solvent resistance, and the like, a resin which is curable by crosslinking is preferable, and an ultraviolet curable resin which is curable within a short period of time is more preferable. Examples of the monomer which can be used for forming the overcoat layer include ethyl (meth)acrylate, ethylhexyl (meth)acrylate, styrene, methylstyrene, N-vinylpyrrolidone, polymethylol propane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

The thickness of the overcoat layer may be selected depending on the maximum height of the dot without any particular limitation, and is preferably about 5 μm to 100 μm, more preferably 10 μm to 50 μm, and still more preferably 2 μm to 40 μm. The thickness is the distance from a surface of the substrate, where the dot is formed, to a surface of the overcoat layer provided on a surface of the substrate, where the dot is not formed, which is opposite to the surface where the dot is formed.

<Application of Optical Member>

The application of the optical member according to the present invention is not particularly limited and can be used as various reflection members.

For example, the optical member having a configuration in which a plurality of dots are formed to be adjacent to each other on the surface of the substrate can be used as a retroreflection member which reflects only circularly polarized light at a specific wavelength.

Regarding the optical member where the dots are provided in a pattern shape, for example, by forming the pattern as a dot pattern which is encoded to present position information, the optical member can be used as an input medium which is used in combination with input means such as an electronic pen for converting handwritten information into digital data and inputting the digital data into an information processing device. The optical member is used after preparing the liquid crystal material for forming the dot such that the wavelength of light irradiated from the input means is the same as that where the dot exhibits reflecting properties. Specifically, the helical pitch of the cholesteric structure may be adjusted using the above-described method.

The optical member according to the present invention can also be used as an input medium such as an input sheet on a display screen such as a liquid crystal display. At this time, it is preferable that the optical member is transparent. The optical member may be attached to a display screen directly or with another film interposed therebetween so as to be integrated with a display, or may be detachably mounted on a display screen. At this time, it is preferable that the wavelength range of light where the dot in the optical member according to the present invention exhibits selective reflection is different from that of light emitted from a display. That is, it is preferable that the dot has selective reflecting properties in the invisible range and that the display emits invisible light such that a detecting device does not detect light erroneously.

The details of an handwriting input system for converting handwritten information into digital data and inputting the digital data into an information processing device can be found in, for example. JP2014-67398A, JP2014-98943A, JP2008-165385A, paragraphs "0021" to "0032" of JP2008-108236A, or JP2008-077451A.

Examples of a preferable embodiment of the case where the optical member according to the present invention is used as the sheet which is mounted on or in front of a surface of an image-displayable device include an embodiment described in paragraphs "0024" to "0031" of JP4725417B.

Figure 2:
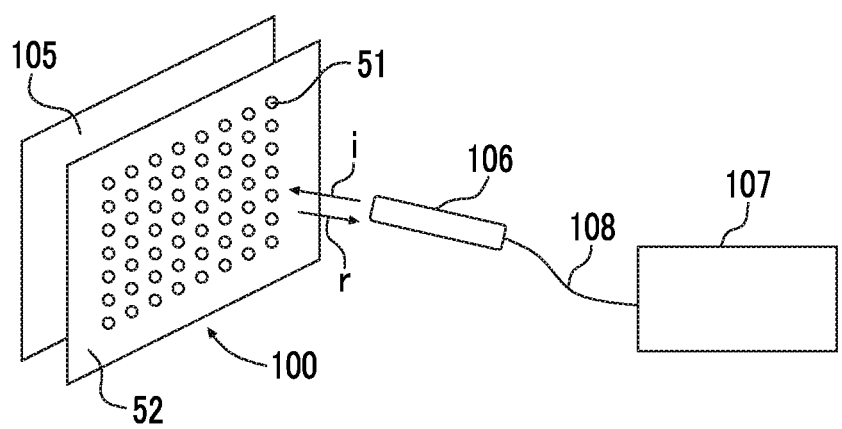
FIG. 2 is a schematic diagram showing a system in which the optical member according to the present invention is used as a sheet which is mounted on or in front of a surface of an image display device (image-displayable device).

FIG. 2 is a schematic diagram showing a system in which the optical member according to the present invention is used as a sheet which is mounted on or in front of a surface of an image-displayable device.

In FIG. 2, a well-known sensor may be used without any particular limitation as long as it emits infrared light i and can detect reflected light r from the above-described pattern. Examples of a pen type input terminal 106 including a read data processing device 107 include an input terminal described in JP2003-256137A including: a pen point that does not include an ink, graphite, or the like; a complementary metal-oxide semiconductor (CMOS) camera that includes an infrared irradiating portion; a processor, a memory; a communication interface such as a wireless transceiver using a Bluetooth (registered trade name) technique; and a battery.

Regarding the operation of the pen type input terminal 106, for example, the pen point is drawn in contact with a front surface of the optical member 100 according to the present invention, the pen type input terminal 106 detects a writing pressure applied to the pen point, and the CMOS camera operates such that a predetermined range around the pen point is irradiated with infrared light at a predetermined wavelength which is emitted from the infrared irradiating portion and such that the pattern is imaged (for example, the pattern is imaged several ten times to several hundred times per second). In a case where the pen type input terminal 106 includes the read data processing device 107, the imaged pattern is analyzed by the processor such that an input trajectory generated by the movement of the pen point during handwriting is converted into numerical values and data to generate input trajectory data, and the input trajectory is transmitted to an information processing device.

Members such as the processor, the memory, the communication interface such as a wireless transceiver using a Bluetooth (registered trade name) technique, or the battery may be provided outside of the pen type input terminal 106 as the read data processing device 107 as shown in FIG. 2. In this case, the pen type input terminal 106 may be connected to the read data processing device 107 through a cord 108, or may transmit read data wirelessly using an electric wave, infrared light, or the like.

In addition, the input terminal 106 may be a reader described in JP2001-243006A.

The read data processing device 107 which can be used in the present invention is not particularly limited as long as it has a function of calculating position information based on continuous image data read from the input terminal 106 and providing the calculated position information together with time information as generate input trajectory data which can be processed in an information processing device. The read data processing device 107 only has to include the members such as the processor, the memory, the communication interface, and the battery.

In addition, the read data processing device 107 may be embedded in the input terminal 106 as described in JP2003-256137A, or may be embedded in an information processing device including a display device. In addition, the read data processing device 107 may transmit the position information to an information processing device including a display device wirelessly, or may be connected thereto through a cord or the like.

In the information processing device connected to a display device 105, an image displayed on the display device 105 is sequentially updated based on trajectory information transmitted from the read data processing device 107 such that a trajectory which is handwritten by the input terminal 106 is displayed on the display device as if it was drawn on paper by a pen.

<Image Display Device>

An image display device according to the present invention includes the optical member according to the present invention.

It is preferable that the optical member according to the present invention is mounted on or in front of an image display surface of the image display device. For example, in the image display device, the optical member according to the present invention may be disposed between an outermost surface or a front surface protective plate of a display device and a display panel. A preferable embodiment of the image display device can be found in the above description regarding the application of the optical member.

The invention described in this specification also includes a system including the image display device in which the optical member according to the present invention is mounted on or in front of an image display surface.

EXAMPLES

Hereinafter, the present invention will be described in detail using examples. Materials, reagents, amounts thereof, proportions thereof, operations, and the like shown in the following examples can be appropriately changed as long as they do not depart from the scope of the present invention. Accordingly, the scope of the present invention is not limited to the following examples.

Example 1

(Preparation of Underlayer)

A composition shown below was stirred and dissolved in a container held at 25° C. to prepare an underlayer-forming solution.

Underlayer-Forming Solution (Part(s) by Mass)
Propylene glycol monomethyl ether acetate: 67.8
Dipentaerythritol hexaacrylate (trade name: KAYARAD DPHA, manufactured by Nippon Kayaku Co., Ltd.): 15.0
MEGAFACE RS-90 (manufactured by DIC Corporation): 26.7
IRGACURE 819 (manufactured by BASF SE): 0.5

The underlayer-forming solution prepared as described above was applied to a transparent polyethylene terephthalate (PET; COSMOSHINE A4100, manufactured by Toyobo Co., Ltd.) substrate having a thickness of 100 μm using an bar coater in an application amount of 3 mL/m². Next, the underlayer-forming solution was heated such that the film surface temperature was 90° C., and then was dried for 120 seconds. Next, in a nitrogen purged atmosphere having an oxygen concentration of 100 ppm or lower, 700 mJ/cm² (illuminance: 200 mW/cm², 3.5 seconds) of ultraviolet light was irradiated using an ultraviolet irradiation device to promote a crosslinking reaction. As a result, an underlayer was prepared.

(Formation of Cholesteric Liquid Crystal Dot)

A composition shown below was stirred and dissolved in a container held at 25° C. to prepare Cholesteric liquid crystal ink solution A (liquid crystal composition).

Cholesteric Liquid Crystal Ink Solution A (Part(s) by Mass)
Methoxyethyl acrylate: 145.0
A mixture of rod-shaped liquid crystal compounds having the following structures: 100.0
IRGACURE 819 (manufactured by BASF SE): 10.0
A chiral agent having the following structure: 3.2
A surfactant having the following structure: 0.08

Rod-Shaped Liquid Crystal Compound

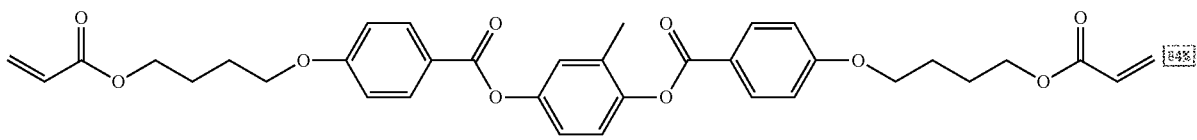

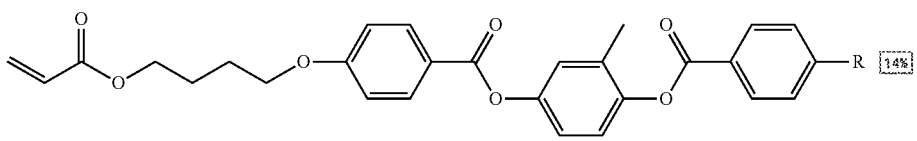

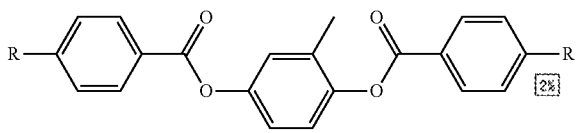

R:

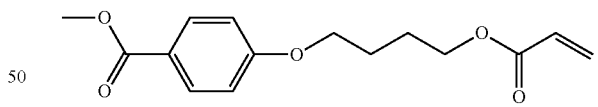

Numerical values are represented by mass %. In addition, a group represented by R is a partial structure present on the left and right sides, and this partial structure is bonded to an oxygen atom portion.

Chiral Agent

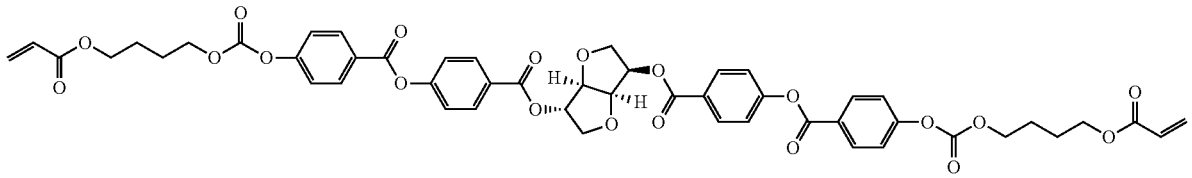 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

Surfactant

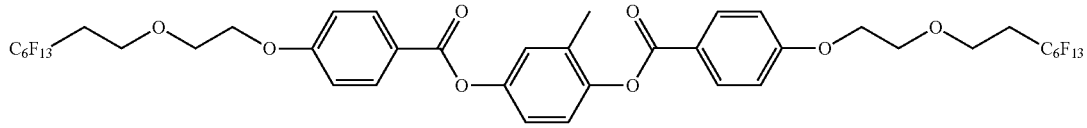

Cholesteric liquid crystal ink solutions B to D were prepared using the same method as that of Ink solution A, except that the addition amount of the chiral agent was changed as follows.

The amount of the chiral agent in Ink solution B: 3.5 parts by mass

The amount of the chiral agent in ink solution C: 3.8 parts by mass

The amount of the chiral agent in ink solution D: 8.3 parts by mass

The addition amounts of the chiral agents in Ink solutions A to D were determined such that the wavelengths of reflected light were 950, 900, 850, and 360 nm, respectively.

Cholesteric liquid crystal ink solution A prepared as described above was applied to the entire 50×50 mm region of the underlayer of the PET prepared as described above using an ink jet printer (DMP-2831, manufactured by Fujifilm Dimatix Inc.) such that the distance between dot centers was 300 μm and the dot diameter was 64 μm. Next, Cholesteric liquid crystal ink solution A was dried at 95° C. for 30 seconds and was irradiated with 500 mJ/cm$^2$ (illuminance: 200 mW/cm$^2$, 2.5 seconds) of ultraviolet light using an ultraviolet irradiation device. As a result, a dot precursor was obtained.

Further, Cholesteric liquid crystal ink solution C prepared as described above was applied to a surface of the dot precursor prepared as described above. Next, Cholesteric liquid crystal ink solution C was dried at 95° C. for 30 seconds and was irradiated with 500 mJ/cm$^2$ (illuminance: 200 mW/cm$^2$, 2.5 seconds) of ultraviolet light using an ultraviolet irradiation device. As a result, a dot (refractive index: 1.57) having a diameter of 109 μm was formed, and an optical member was obtained.

(Dot Shape and Evaluation of Cholesteric Structure)

Among the dots of the optical member obtained as described above, 10 dots were selected arbitrarily, and the shapes of the dots were observed using a laser microscope (manufactured by Keyence Corporation). The average diameter of the dots was 109 μm, the average maximum height was 21 μm, an average angle at a contact portion between a dot surface of a dot end portion and a underlayer surface was 41 degrees, and the height was continuously increased in a direction from the dot end portion to the center.

Regarding one dot positioned at the center of the obtained optical member, a surface including the dot center was cut in a direction perpendicular to the PET substrate, and the obtained cross-section was observed using the above-described scanning electron microscope. As a result, a stripe pattern including bright portions and dark portions was observed in the dot.

In addition, in a reflection observation system including a polarizing microscope (ECLIPSE E600 POL, manufactured by Nikon Corporation), a digital camera for a microscope (DXM1200), and an application software (ACT-1), the dot of the optical member obtained as described above was observed after cutting visible light using an IR sharp cut filter (IR80, manufactured by Fujifilm Corporation) and tilting the optical member at 27°. As a result, retroreflected light was observed.

(Formation of Overcoat Layer)

A composition shown below was stirred and dissolved in a container held at 25° C. to prepare an overcoat layer-forming coating solution.

Overcoat Layer-Forming Coating Solution (Part(s) by Mass)

Acetone: 100.0

KAYARAD DPCA-30 (manufactured by Nippon Kayaku Co., Ltd.): 100.0

IRGACURE 819 (manufactured by BASF SE): 3.0

The overcoat layer-forming coating solution prepared as described above was applied to the underlayer, where the cholesteric liquid crystal dot was formed, using an applicator in an application amount of 80 mL/m$^2$. Next, the overcoat layer-forming coating solution was heated such that the film surface temperature was 50° C., and then was dried for 60 seconds. Next, 700 mJ/cm$^2$ of ultraviolet light was irradiated using an ultraviolet irradiation device to promote a crosslinking reaction. As a result, an overcoat layer (refractive index: 1.52) was prepared.

(Evaluation of Dot Performance)

In addition, using an visible and near-infrared light source (HL-2000, manufactured by Ocean Optics Inc.), a ultra high-resolution multi-channel fiber spectrophotometer (HR4000), and a 2-branched optical fiber, the wavelength selective reflecting properties of the optical member with the overcoat layer were measured in 5 arbitrary visual fields having a diameter of 2 mm in a normal direction perpendicular to the optical member. In all the visual fields, two reflection peak wavelengths of 850 nm and 950 nm were observed. In addition, two reflection peak wavelengths of 850 nm and 950 nm were observed with respect to incident light with a polar angle of 45° in a case where the normal line perpendicular to the optical member was set as 0°.

Examples 2 to 9 and Comparative Examples 1 to 3

Optical members with the overcoat layer were prepared using the same method as in Example 1, except that the use order of the cholesteric liquid crystal ink solutions, the amount of DPHA in the underlayer-forming solution, and the dot diameter of ink jet were changed as shown in the following table.

Using the same method as in Example 1, the dot diameter, maximum height/diameter, the reflection peak wavelengths when the dot was observed from the front or with a tilt angle of 45° were measured, and the results thereof are shown in the following table.

TABLE 1

| | Use Order of Ink Solution | Amount of DPHA in Underlayer (Part(s) by Mass) | Diameter (μm) | Maximum Height/Diameter | Angle Between Dot Surface and Substrate In Dot End portion (°) | Retroreflection With Tilt Angle of 27° | Reflection Peak Wavelength When Dot Observed From Front (nm) | Reflection Peak Wavelength When Dot Observed With Tilt Angle of 45° (nm) |
|---|---|---|---|---|---|---|---|---|
| Example 1 | A→C | 15 | 109 | 0.19 | 41 | Exhibited | 850 and 950 | 850 and 950 |
| Example 2 | B→C | 15 | 29 | 0.16 | 35 | Exhibited | 850 and 900 | 850 and 900 |
| Example 3 | B→C | 15 | 80 | 0.17 | 37 | Exhibited | 850 and 900 | 850 and 900 |
| Example 4 | B→C | 15 | 109 | 0.19 | 41 | Exhibited | 850 and 900 | 850 and 900 |
| Example 5 | B→C | 5 | 96 | 0.27 | 56 | Exhibited | 850 and 900 | 850 and 900 |
| Example 6 | B→C | 5 | 122 | 0.30 | 62 | Exhibited | 850 and 900 | 850 and 900 |
| Example 7 | A→B→C | 15 | 109 | 0.19 | 41 | Exhibited | 850, 900, 950 | 850, 900, 950 |
| Example 8 | C→D | 15 | 109 | 0.19 | 41 | Exhibited | 360 and 850 | 360 and 850 |
| Example 9 | D→C | 15 | 109 | 0.19 | 41 | Exhibited | 360 and 850 | 360 and 850, Weak Intensity at 360 |
| Comparative Example 1 | Only C | 15 | 80 | 0.13 | 29 | Not Exhibited | Only 850 | Only 850 |
| Comparative Example 2 | Only B | 15 | 80 | 0.13 | 29 | Not Exhibited | Only 900 | Only 900 |
| Comparative Example 3 | Only D | 15 | 80 | 0.13 | 29 | Not Exhibited | Only 360 | Only 360, Weak Intensity |

As described above, the optical member according to the present invention has reflection peaks at a plurality of wavelengths and thus can be used in electronic pens (pen type input terminals) having various specifications (emission wavelength, light receiving wavelength).

EXPLANATION OF REFERENCES

1: dot
2: substrate
3: support
4: underlayer
5: overcoat layer
100: optical member
105: display device
106: pen type input terminal
107: read data processing device
108: cord

What is claimed is:

1. An optical member comprising:
a substrate; and
a dot that is in contact with a surface of the substrate,
wherein the dot is formed of a liquid crystal material having a cholesteric structure, and
wherein the dot exhibits wavelength selective reflecting properties having two or more reflection peaks with respect to both of incident light with an angle of 0° from a normal line perpendicular to the substrate and incident light with an angle of 27° from the normal line perpendicular to the substrate.

2. The optical member according to claim 1,
wherein the dot has two or more cholesteric structures having different helical pitches.

3. The optical member according to claim 2,
wherein the dot includes a portion which has two or more layered cholesteric structures having different helical pitches in a normal direction perpendicular to the substrate, and
sizes of the helical pitches of the two or more cholesteric structures increase toward the substrate.

4. The optical member according to claim 1,
wherein a plurality of the dots are provided in a pattern shape on the surface of the substrate.

5. The optical member according to claim 2,
wherein a plurality of the dots are provided in a pattern shape on the surface of the substrate.

6. The optical member according to claim 1,
wherein a diameter of the dot is 20 to 200 μm.

7. The optical member according to claim 1,
wherein a diameter of the dot is 70 to 150 μm.

8. The optical member according to claim 1,
wherein a value obtained by dividing a maximum height of the dot by the diameter of the dot is 0.16 to 0.30.

9. The optical member according to claim 1,
wherein in an end portion of the dot, an angle between a surface of the dot and the substrate is 33° to 62°.

10. The optical member according to claim 1,
wherein the liquid crystal material is a material obtained by curing a liquid crystal composition including a liquid crystal compound and a chiral agent.

11. The optical member according to claim 1,
wherein at least one of the reflection peaks is present in an infrared range.

12. The optical member according to claim 4,
wherein at least one of the reflection peaks is present in an infrared range.

13. The optical member according to claim 11,
wherein at least one of the reflection peaks is present in a wavelength range of 800 to 950 nm.

14. The optical member according to claim 1 which is transparent.

15. The optical member according to claim 11 which is transparent.

16. The optical member according to claim 12 which is transparent.

17. An image display device comprising the optical member according to claim 14.

18. An image display device comprising the optical member according to claim 15.

19. An image display device comprising the optical member according to claim 16.

20. An optical member comprising:
a substrate; and
a dot that is in contact with a surface of the substrate,
wherein the dot is formed of a liquid crystal material having a cholesteric structure,
wherein the dot exhibits wavelength selective reflecting properties having two or more reflection peaks,
wherein the dot has two or more cholesteric structures having different helical pitches,
wherein the dot includes a portion which has two or more layered cholesteric structures having different helical pitches in a normal direction perpendicular to the substrate, and
wherein sizes of the helical pitches of the two or more cholesteric structures increase toward the substrate.

\* \* \* \* \*